US007546403B2

(12) United States Patent
Noble et al.

(10) Patent No.: US 7,546,403 B2
(45) Date of Patent: *Jun. 9, 2009

(54) METHOD AND APPARATUS FOR A DISC DRIVE CLIENT INTERFACE

(75) Inventors: Gayle L. Noble, Boulder Creek, CA (US); Rick S. Shimizu, San Jose, CA (US); Jason P. Hanlon, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 475 days.

This patent is subject to a terminal disclaimer.

(21) Appl. No.: 11/070,447

(22) Filed: Mar. 1, 2005

(65) Prior Publication Data

US 2005/0149647 A1 Jul. 7, 2005

Related U.S. Application Data

(63) Continuation of application No. 09/892,317, filed on Jun. 26, 2001, now Pat. No. 6,880,023.

(60) Provisional application No. 60/220,657, filed on Jul. 25, 2000.

(51) Int. Cl.
*G06F 13/12* (2006.01)

(52) U.S. Cl. ............................................. 710/74; 710/5

(58) Field of Classification Search .................. None
See application file for complete search history.

(56) References Cited

U.S. PATENT DOCUMENTS

| 5,528,375 A | 6/1996 | Wegeng et al. |
| 5,715,455 A * | 2/1998 | Macon et al. ............... 707/205 |
| 5,991,824 A | 11/1999 | Strand et al. |
| 6,073,232 A | 6/2000 | Kroeker et al. |
| 6,078,742 A | 6/2000 | Chow |
| 6,081,407 A | 6/2000 | Khuu |
| 6,088,202 A | 7/2000 | Kabasawa et al. |
| 6,088,743 A | 7/2000 | Takeda |
| 6,094,707 A | 7/2000 | Sokolov et al. |
| 6,128,717 A | 10/2000 | Harrison et al. |
| 6,185,574 B1 * | 2/2001 | Howard et al. ............... 707/200 |
| 6,195,217 B1 | 2/2001 | Park |
| 6,202,118 B1 * | 3/2001 | Klein ............................ 711/4 |

(Continued)

OTHER PUBLICATIONS

Goldman. Located at www.cs/wustl.edu/kjg/cs102/Notes/StreamNfiles, allegedly Copyright 1999, printed Apr. 20, 2003.

(Continued)

*Primary Examiner*—Eron J Sorrell
(74) *Attorney, Agent, or Firm*—Novak Druce + Quigg LLP

(57) ABSTRACT

Aspects of the invention include a method and apparatus to transfer specific data files from a disc drive storage system to an output device such as a printer. In one aspect, the disc drive uses a transfer protocol that determines the files stored from a peripheral device and sent to the output device. In another aspect, the transfer program compares the files sent to the output device to a file structure stored on the disc drive and presents the unsent files to the output device for processing.

20 Claims, 5 Drawing Sheets

U.S. PATENT DOCUMENTS

| | | | |
|---|---|---|---|
| 6,209,070 | B1 | 3/2001 | Reed et al. |
| 6,282,045 | B1 | 8/2001 | Glover |
| 6,349,351 | B1 | 2/2002 | Shimizu et al. |
| 6,512,767 | B1 * | 1/2003 | Takeda et al. ............... 370/389 |
| 6,622,151 | B1 | 9/2003 | Hamamoto et al. |
| 6,880,023 | B2 | 4/2005 | Noble et al. |

OTHER PUBLICATIONS

Messner et al. (2001) "A tutorial on controls for disk drives," *Proceedings of the American Control Conference* 2001, vol. 1, pp. 408-420.

Reiley et al. (Jun. 22-24, 1998). "Micro Drive—A Pluggable One-Inch Disk Drive For Portable Devices", *Nonvolatile Memory Technology Conference, 1998 Proceedings, Seventh Biennial IEEE*, pp. 51-54.

Richkus et al. (1999). "Virtual Disk Drive Design Game With Links to Math, Physics And Dissection Activities", *Frontiers in Education COnference, FIE '99, 29th Annual*, vol. 2, pp. 12C3/18-12C3/22.

Teener, "High Performance Serial Buss. IEEE 1394-1995," allegedly copyright 1999, Zayante, Inc.

* cited by examiner

METHOD AND APPARATUS FOR A DISC DRIVE CLIENT INTERFACE

CROSS-REFERENCE TO A RELATED APPLICATION

This application is a continuation application of and claims priority to U.S. patent application Ser. No. 09/892,317 filed Jun. 26, 2001 entitled METHOD AND APPARATUS FOR A DISC DRIVE CLIENT INTERFACE in the name of Gayle L. Noble, Rick S. Shimizu, and Jason P. Hanlon, which is based on U.S. Provisional Patent Application Serial No. 60/220,657 filed Jul. 25, 2000 entitled "USB Client Handling Images for Storage Devices" filed in the name of Gayle L. Noble, Rick S. Shimizu, and Jason P. Hanlon. The priority of this provisional application is hereby claimed.

U.S. Patent application entitled "METHOD AND APPARATUS FOR A DISC DRIVE INTERFACE", Ser. No. 09/892,290 filed on Jun. 26, 2001, filed in the name of Gayle L. Noble, Rick S. Shimizu, and Jason P. Hanlon is hereby incorporated herein by reference in its entirety.

BACKGROUND OF THE INVENTION

1. Field of the Invention

The invention generally relates to storing and retrieving data on a disc drive.

2. Background of the Related Art

Disc drives are capable of storing large amounts of digital data in a relatively small area. Disc drives store information on one or more recording media. The recording media conventionally takes the form of a circular storage disc, e.g., media, having a plurality of recording tracks. Conventional disc drives include one or more vertically aligned storage discs, each with at least one magnetic head for reading or writing information to the media. Typically, the magnetic head is attached to a positioner arm assembly that uses a motor to align the magnetic head above a selected track on the disc. The location of the magnetic head is typically determined by a disc controller that is given the position of a data area on the disc to read or write data. The precise location and movement of the head is typically accomplished by incorporating a closed-loop electromechanical servo system with a dedicated servo region, or regions, used to provide high speed or continuous feedback to the system to maintain accurate positioning of the data head.

Due to their large storage capacity relative to other forms of electronic digital data storage, disc drives are often used by electronic systems such as computers to permanently or semi-permanently store applications, e.g., image files, software programs, data, etc. The amount of data stored on disc drives is a function of the media density, size, and number of medias used. The applications are generally stored as files that are then used by an end user, or users, to perform tasks such as word processing, calculations, and the like. To assist the applications in locating a file, conventional computer operating systems generally use a layered directory structure.

The conventional layered directory structures usually have a main directory and then sub directories where the files are stored. For example, using the DOS operating system, a file named "xyz" may be given a logical location such as "c:/xyz" indicating that the file is located on the "c" drive at the root directory "/".

To allow an application to find and use files on the media, each file is given a different logical location on the media by the computer operating system. Operating systems communicate with the disc drive using logical block addresses (LBA). When an application makes a request for a file from the operating system, the operating system uses the file name to look up the location in terms of a starting LBA and the number of LBAs needed to read or write the file. The LBA is then translated by internal disc drive software to the actual physical location on the disc drive, i.e., the physical block address (PBA). The PBA includes a number of data sectors depending upon the location of the PBA on the media for storing data. The translation from LBA to PBA is necessary to allow the disc drive to implement a defect management scheme and to set aside reserved areas on the media for manufacturer specific data not generally accessible to the operating system such as disc drive operating firmware, etc.

Currently, with limited data storage available to peripheral devices, the disc drive is becoming a preferred storage medium for large files such as a digital image files. Unfortunately, peripheral devices such as printers do not have operating systems that interface directly with disc drives. Generally, to transfer a file from a disc drive to a printer requires the user to use a computer having the proper device driver(s) to establish the interface and transfer the files. While some peripheral devices such as digital cameras may directly connect to printers having the proper communication interface such as a universal serial interface (USB), those devices having 1394 interface and/or an infrared data association (IRDA) wireless connection must also rely on a computer to handle the data transfer. Although the some disc drives may interface with a computer directly through the USB, the required data structure and printer drivers are not available to the disc drive except when working in conjunction with a computer operating system.

Thus, what is needed is a method and apparatus that allows the disc drive to interface and transfer data directly to a host device such as a printer in an efficient and effective manner.

SUMMARY OF THE INVENTION

Aspects of the invention have particular advantages in electronic data storage systems. In one embodiment, the invention provides providing data and a data structure from a peripheral device to a disc drive, interfacing the disc drive with a host device, transferring the data from a disc drive to the host output device, determining a data transfer structure; and storing the data transfer structure.

In another embodiment, the invention provides a method of transferring data from a client disc drive to a host device, including the steps of connecting a disc drive client device to a host across an interface, where if the host is not communicating to the disc drive client then aborting the transfer of data, where if the disc drive client is responsive to the host device, then determining a disc drive client data structure, then determining the file type and size stored on the disc drive client, determining the files transferred from the disc drive client to the host device; and comparing the disc drive client file structure and the files transferred to the host device; and transferring the difference.

In still another embodiment, the invention provides a disc drive system including a signal-bearing media means for storing data, a code memory means coupled to a read/write controller means for controlling the reading and writing of data to the signal-bearing media, means for reading and writing the data to the signal-bearing media, means for interfacing with a host device, a processor means coupled to the code memory and the read/write controller comprising a program for transferring the data from the media to the host device.

BRIEF DESCRIPTION OF THE DRAWINGS

So that the manner in which the above recited features, advantages, objects, and aspects of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

Other features and advantages of the invention will become apparent to a person of skill in this field who studies the following description of an embodiment given below in association with the following drawings.

DETAILED DESCRIPTION OF THE PREFERRED EMBODIMENT

Aspects of the invention have particular advantages in electronic data storage systems. One exemplary electronic data storage system commonly used in the computer industry, well suited for supporting the optimization method described herein, is known as a disc drive. As will be described below, aspects of the invention pertain to specific method steps implementable on computer disc-drive systems.

In one embodiment, the invention may be implemented as part of a computer program-product for use with computer disc-drive systems. The programs defining the functions of a preferred embodiment can be provided to the disc drive via a variety of signal-bearing media, which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disc drive); or (iii) information conveyed to a computer by communications medium, such as through a computer or telephone network, including wireless communication. Such signal-bearing media, when carrying computer-readable instructions that direct the functions of aspects of the invention, represent alternative embodiments of the invention. It may also be noted that portions of the product program may be developed and implemented independently, but when combined together constitute embodiments of the invention.

Figure 1:
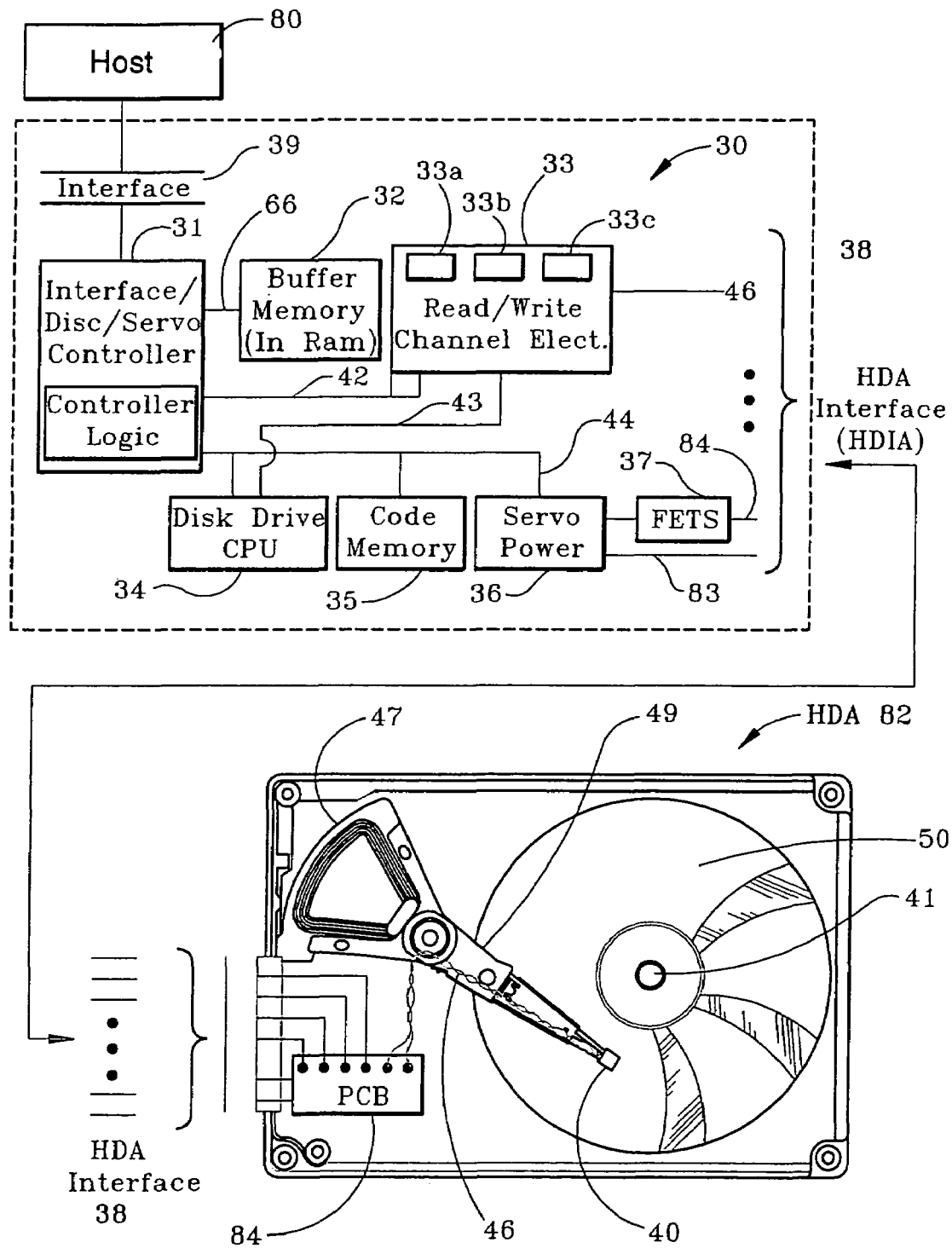
FIG. 1 is a plan view of a conventional disc-based apparatus for reading and writing data on a media wherein aspects of the invention may be used to advantage.

FIG. 1 is a plan view of a typical disc-based apparatus for reading and writing data on a media 50 wherein aspects of the invention may be used to advantage. FIG. 1 illustrates one embodiment of the invention including disc drive electronics 30 which in general includes a client interface 39 such as a universal serial interface (USB) adapted to receive external signals and data, and a Head Disc Assembly Interface (HDAI) 38 for connecting the disc drive electronics 30 to the head disc assembly (HD) 82. The HD 82 includes read/write transducer head(s) 40 coupled via wires 46 to the HDAI 38, a spindle motor 41, an actuator arm 49, a servo actuator 47, and other disc drive components that are well known in the art. The read/write transducer head(s) 40 are mounted on the actuator arm 49. As the servo actuator 47 moves the actuator arm 49, the read/write transducer head(s) 40 fly above the media 50 to read and write data to the media 50. The media 50 typically includes a disc or discs coated with a recording material such as ferrous iron, magneto-optical media, and other materials adapted to hold a magnetic charge. Media 50 may also include optical media such as a DVD adapted to optically store digital information. A host device 80 such as a printer of any conventional design includes a file transfer interface such as a USB communication interface, and the like, adapted to receive digital information and communicate with the disc drive electronics 30 through client interface 39.

The interface/disc/servo controller 31 provides a translation and command interface such as a USB interface and the like between the host device 80 and disc drive electronics 30 through the client interface 39. The interface/disc/servo controller 31 is directly connected to the buffer memory 32 through a memory bus connection 66. The buffer memory 32 may store program code and/or data for use with the operation of the drive. Interface/disc/servo controller 31 is also connected via a read/write bus 44 to a CPU 34 used for processing the disc drive commands, a code memory 35 adapted to store operational data and commands, and the servo power electronics 36, adapted to operate the servomotor 41 and actuator arm 49. Servo power electronics 36 are typically connected to the HD 82 via servo control connection PCBA 84 to a plurality of FET switches 37 that control the spin motor 41. The HDAI 38 provides an electrical connection between the printed circuit board assembly (PCBA) 84 including the internal disc drive electronics 30, and the HD 82 including the disc drive internal mechanical and electromechanical components. Read/write channel electronics 33 used to transmit data to and from the media 50 include read write logic 33a, write logic 33b, and servo logic 33c, and includes a connection to the interface/disc/servo controller 31 through the data bus 42 and a connection to the read/write head(s). 40 through read/write line 46. A serial bus 43 is used to send configuration commands from the CPU 34 to the read/write channel electronics 33.

FIG. 1 is merely one hardware configuration for a disc-drive data storage system. Aspects of the invention can apply to any comparable hardware configuration, regardless of whether the disc-drive data storage apparatus is a complicated, multi-media storage apparatus including a plurality of media types, or a single disc-drive data storage apparatus.

Figure 2:
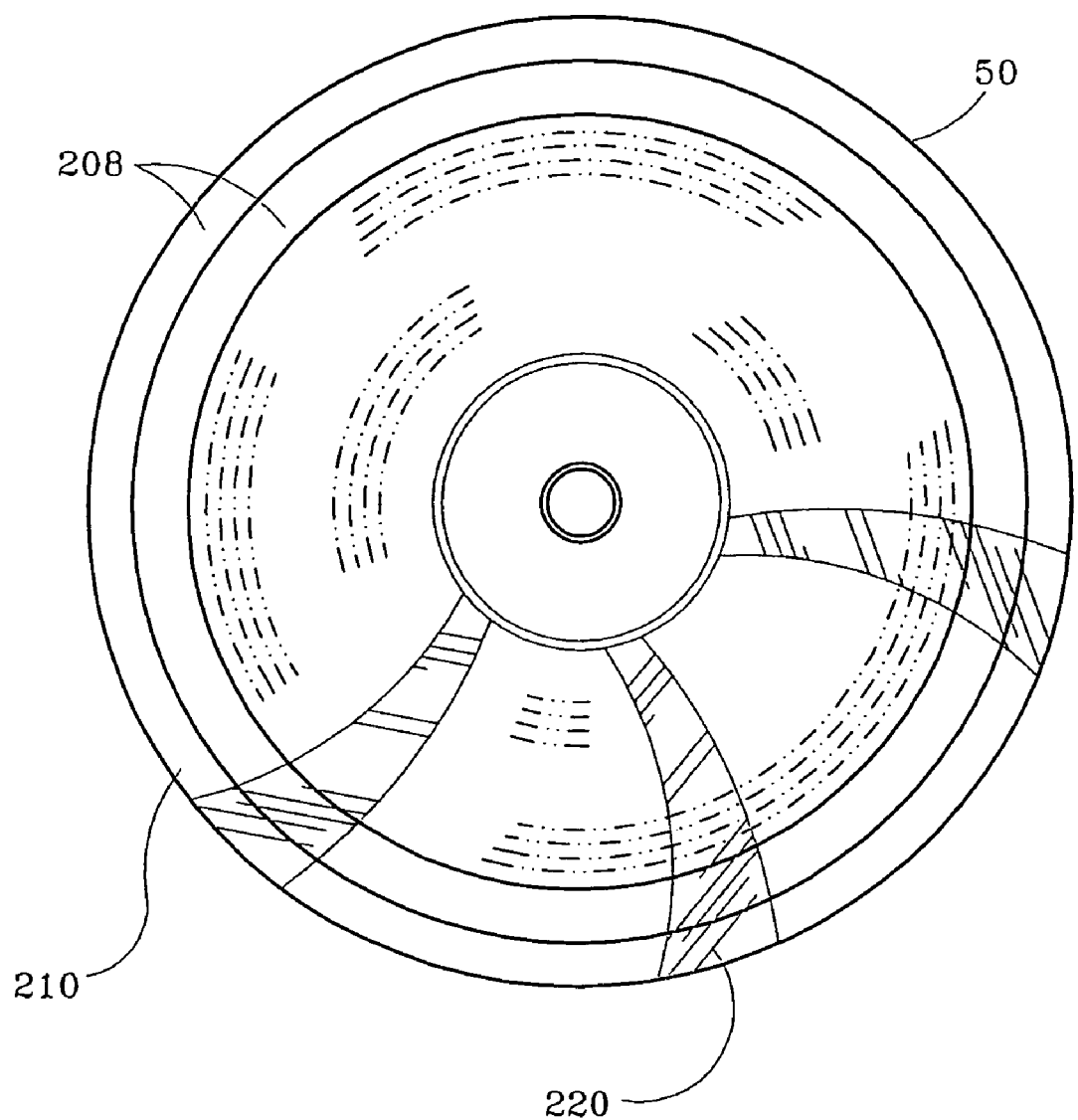
FIG. 2 is a plan view of conventional media for storing data wherein aspects of the invention may be used to advantage.

FIG. 2 is a plan view of the media 50 for storing data wherein aspects of the invention may be used to advantage. FIG. 2 illustrates data storage tracks 208 on the media 50 including data wedges 210 separated by a plurality of servo wedges 220 in accordance to the invention. As necessary, FIG. 1 is referenced in the following discussion of FIG. 2. For clarity, only portions of the tracks 208 are shown. Illustratively, a plurality of the tracks 208 are shown representing a plurality of data wedges 210 and servo wedges 220 extending across the media for data storage and retrieval by the read/write head(s) 40. As the read/write head(s) 40 fly over the media 50, the servo actuator 47 moves the actuator arm 49 and read/write head(s) 40 to a particular track 208 on the media 50 in response from commands of the interface/disc/servo controller 31. The data wedges 210 are generally used for storing external data from an external user such as multimedia files and are generally accessible by the user through the client interface 39. Several adjacent tracks 208 can be combined together to create a "zone" of tracks 208 with similar data densities. The "zone" may represent several data wedges 210. Servo wedges 220 are portions of each track 208 that may include read/write head(s) alignment indicia, physical address information, and check pointing data used for defect management. Servo wedge data is generally for the drive use and is generally inaccessible to the outside user. The servo wedge 220 includes digital data that identifies the particular track (e.g., cylinder) and the sector. The servo wedge also includes area(s) of precisely placed magnetic bursts where the relative amplitude when read from the read/write head(s) 40, indicates the position of the head relative to the track center. Additional fields may be written into the servo wedge 220 as desired by the manufacturer. Data communicated to and from a data storage system is normally managed by the LBA rather than by the PBA. Data sectors are numbered blocks of data to be stored and retrieved. Data sectors are the fundamental units of data handled by the data storage system and are usually of fixed length, e.g., 512 bytes. In one aspect, one data sector equals the length of one data wedge 210. However, if the data wedges 210 are large, as is often the case with magnetic storage systems, several logical addressed data sectors may be stored in a single physical data wedge 210.

Figure 3:
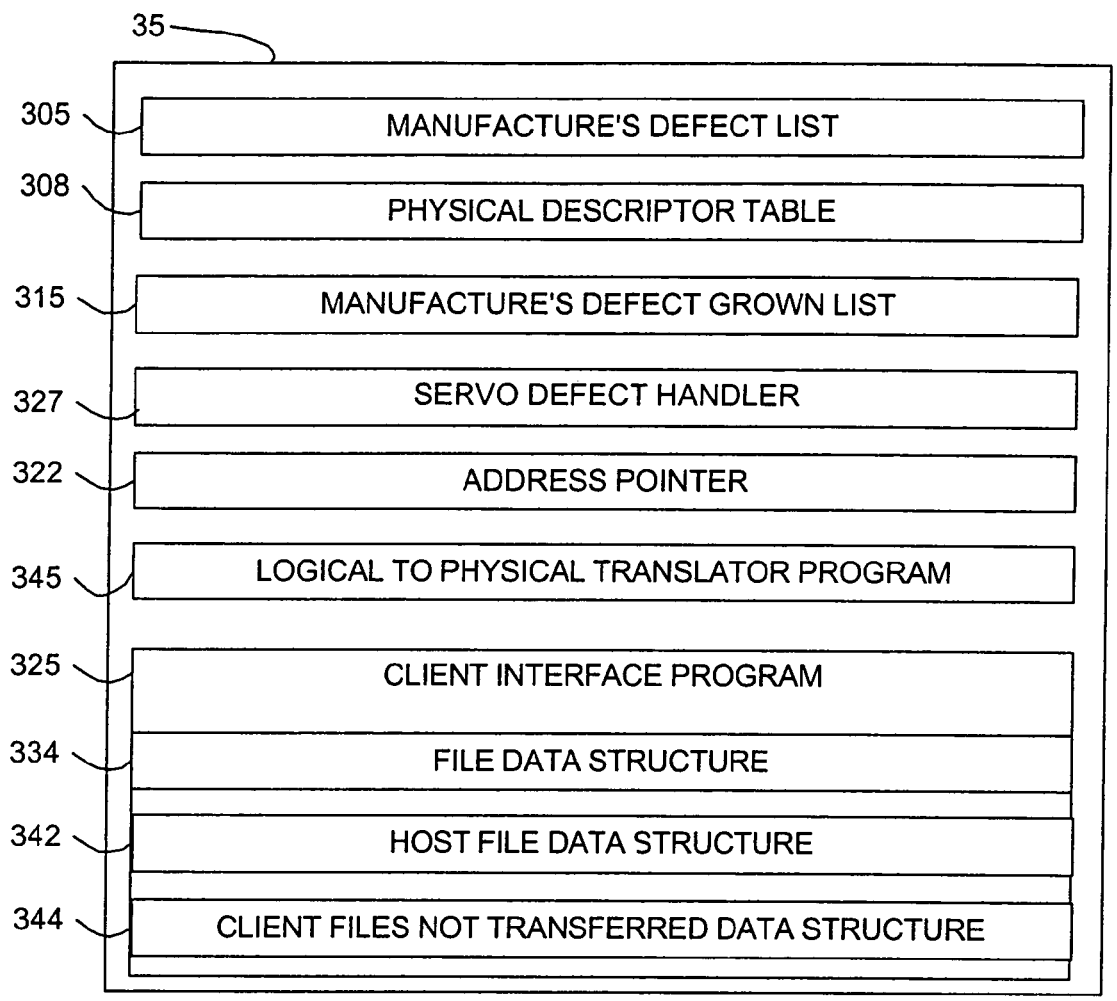
FIG. 3 illustrates a memory core for storing programming data in which aspects of the invention may be used to advantage.

FIG. 3 illustrates the code memory 35 for storing programming data in which embodiments of the invention may be used to advantage. The code memory 35 is preferably random access memory sufficiently large to hold the necessary programming and data structures of the invention. The code memory 35 may be used to store operating code, and other run-time code that enables the drive. For redundancy, the contents of the code memory 35 may also be stored to a plurality of reserved areas of the media 50 or into other areas of the drive electronics 30 such as buffer memory 32.

During manufacture, the recording media 50 is usually written to and then read back from to determine which PBAs are defective. As part of the process of converting a logical block address to a PBA on the media 50 two lists are stored in code memory 35, a manufacturer's defect list 305 and a physical descriptor table 308. The physical descriptor table 308 generally includes servo data that indicates how many bytes of data may be written between each servo wedge 220 and may indicate if the servo wedge 220 is to be skipped. Additionally, the physical descriptor tables 305 may indicate that a zone needs to be skipped, as there may be a very large defect in the media 50 covering more than one data wedge 210 within a zone. The manufacture's defect list 305, i.e., drive defect list, maps the defect relationship between logical and physical addresses between the non-defective physical addresses and logical addresses, and is stored on the media 50 by the manufacture and loaded into the code memory 35 during operation. Additionally, as the media 50 is used, other defects may occur through, for example, the read/write head (s) 40 inadvertently touching the surface of the media 50 during a read and/or write operation and physically damaging a data sector on the media 50. Media defects subsequent to the manufacturer's defect list 305' are placed in the manufacturer's defect grown list 315. Thus, the manufacturer's defect grown list 315 literally "grows" as the media 50 is used.

The code memory 35 further includes a logical to physical translation program 345 adapted to translate the LBA to the physical data location on the media 50 i.e., the PBA. The physical translation program 345 coordinates the translation of the logical address of a particular block of data to the physical address of the location at which the data is stored. The logical to physical translator program 345 uses the physical descriptor table 308, the manufacturer's defect list 305, and manufacturer's defect grown list 315 to determine if the requested sector(s) have moved due to defects during a read or write sequence. The code memory 35 also includes an address pointer 322 used to point the logical to physical translation program 345 to the physical descriptor table 308. The code memory 35 further includes a servo defect handler code 327 used to manage defective servo wedges 220. The data written after a defective servo wedge is generally unreliable. Therefore, the servo defect handler code 327 allows the disc drive to skip defective servo wedges 220 when needed.

The code memory 35 further includes a client interface program 325. The client interface program 325 is adapted to perform a file interface and transfer process from the disc drive to the host device 80. In one aspect, once the files are transferred a host client file data structure 334 is used to store the list of files transferred from the media 50 to the host device 80. In another aspect, the client interface program 325 compares the host file data structure 342 to the client file data structure 334, transfers the files from a files not transferred data structure 344 that have not been transferred, and updates the host file data structure with the file transfer changes.

Although code memory 35 is shown as a single entity, it should be understood that code memory 35 may in fact may be volatile or non-volatile, comprise a plurality of modules, and that the code memory 35 may exist at multiple levels, from high speed registers and caches to lower speed but larger DRAM chips.

Figure 4:
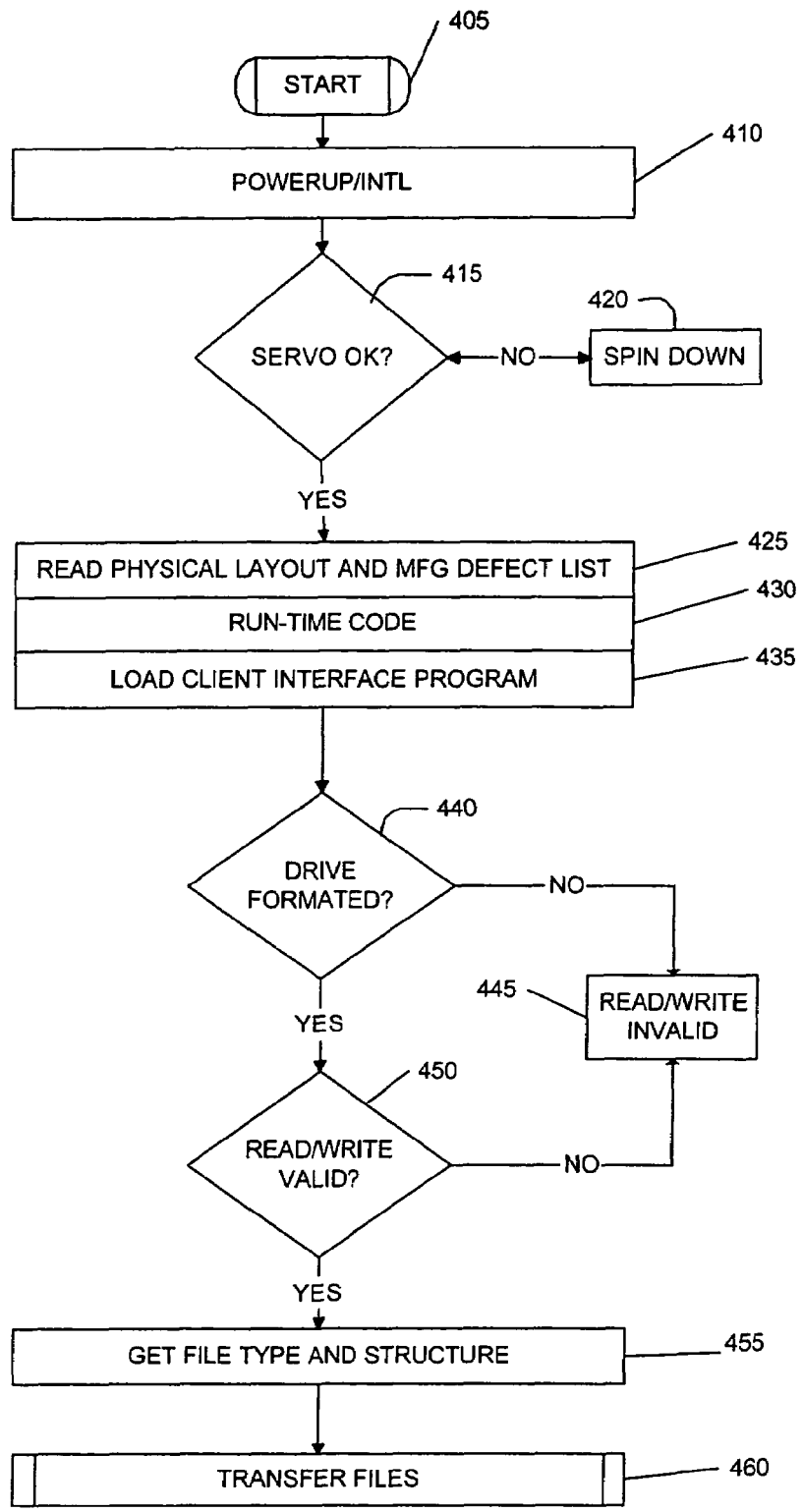
FIG. 4 is a flow diagram of a method for a start-up sequence for the disc-based apparatus of FIG. 1 in accordance with aspects of the invention.

FIG. 4 is a flow diagram of a method 400 for a start-up sequence for the disc-based apparatus of FIG. 1 in accordance with the invention. As necessary, FIGS. 1-4 are referenced in the following discussion of FIG. 5.

FIG. 4 is entered at step 405 when for example the host device 80 instructs the disc drive electronics 30 to transfer data to the media 50. At step 410, the interface/disc/servo controller 31 initializes the disc drive electronics 30, CPU 32, the code memory 35, the servo power 36, FETs 37, the read/write channel electronics 33, and the buffer memory 32 and begins the process of "spinning", i.e., rotating, the media 50 up to prepare the media 50 for a read or write operation. At step 415, the method 400 determines whether the servomotor 41 is functioning properly. If the servomotor 41 is working improperly, the servomotor 41 spins down at step 420. If the servomotor 41 is functioning properly, at 425 the actuator arm 49 positions the read/write transducer head(s) 40 and reads the manufacturer's defect list 305 and physical descriptor table 308 stored within a reserved area within memory and/or on the media 50 such as a reserved area on a servo wedge 220. At step 430, run-time code such as the address pointer 322, the servo defect handler 327, logical to physical translator program 345, and the like, are loaded into the code memory 35 from the media 50 and/or memory into a separate data location to allow the normal operation of the drive. At step 335, the client interface program 325 is loaded into code memory 35 from the media 50 and/or memory. At step 440, the media 50 is checked if it is properly formatted to receive data from the read/write transducer head(s) 40. If the media 50 is not properly formatted, then at 445, the read/write commands are set to invalid. If the read/write commands at step 450 where set to invalid from step 545, then the drive would be unable to be used for storing or retrieving data from the data wedges 210. If the media 50 is properly formatted, the method 400 proceeds to step 455 to get the file allocation table and file types from the host device 80. Subsequently, method 500 then proceeds to step 460 to transfer the files from the host device 80 as described below in reference to FIG. 5.

Figure 5:
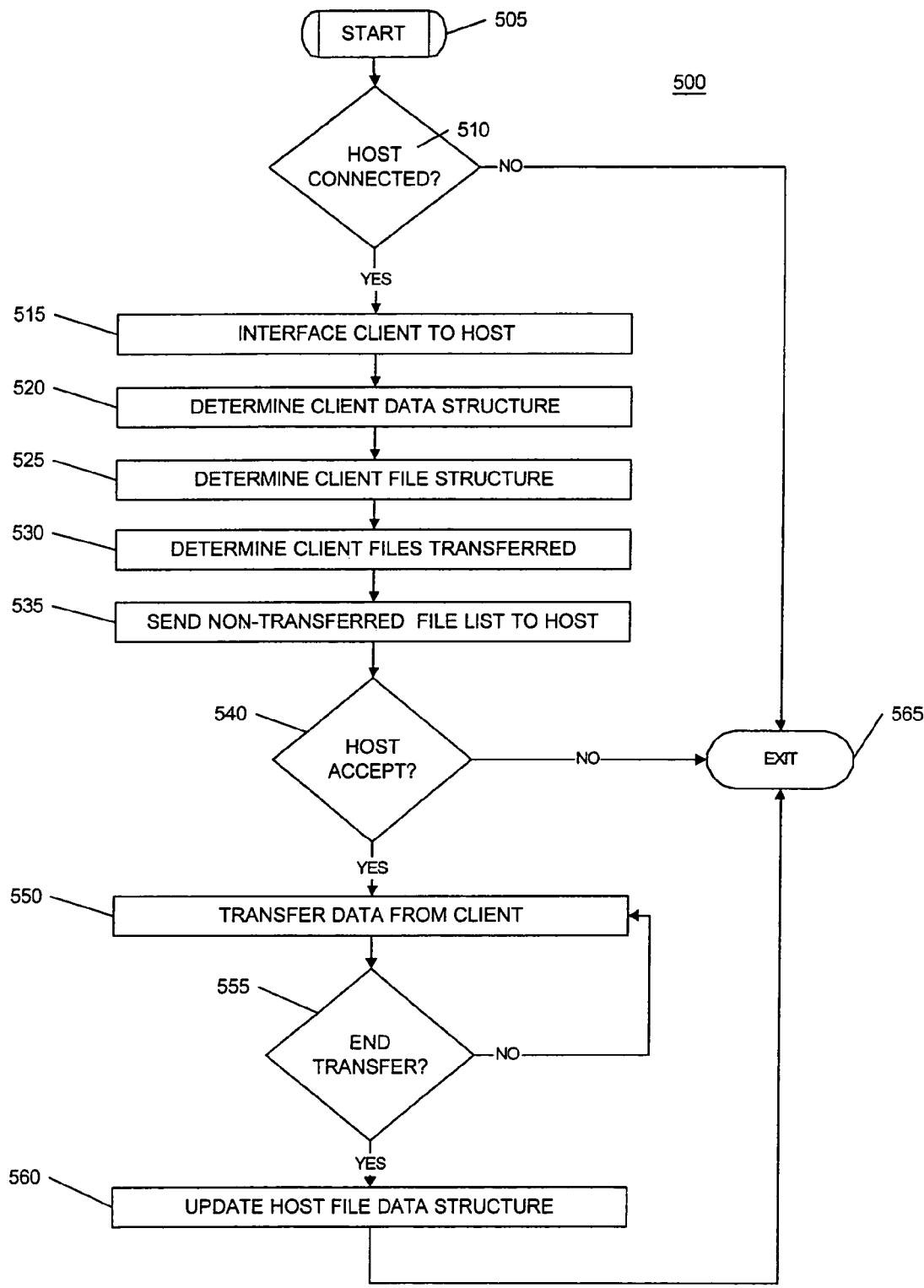
FIG. 5 is a flow diagram of a method for an interface protocol to transfer files directly from a disc-based apparatus of FIG. 1 to a host device in accordance with aspects of the invention.

FIG. 5 is a flow diagram of a method 500 for a method of transferring data from the media 50 to a host device 80 of FIGS. 1 and 2 in accordance with the invention. As necessary, FIGS. 1-4 are referenced in the following discussion of FIG. 5.

FIG. 5 is entered at step 505 when a file transfer from the disc drive client to the host device 80 is initiated from step 460 for example, when the client interface program 325 is enabled. At step 510, the method 500 determines if the host device 80 is connected to the disc drive through the client interface 39. If the host is not connected then the method 500 aborts the transfer and exits at step 560. If the host device 80 is connected to the client interface 39, then the disc drive is interfaced as a client to the host device 80 at step 515. At step 520, the existing data structure 334 is used to determine the location of each file on the media 50 to be transferred. The file structure is determined at step 525 to determine the file type and size being transferred. IN one aspect, the files to be transferred are stored within the client file data structure 334, such as a file allocation table. At step 535, the method 500 retrieves the host file data structure 342, compares the client file data structure 334 to the host file data structure 342 and sends the list of files 344 not transferred to the host. Obviously, if no files had previously been transferred the client file data structure 334 would be sent. If the file list 344 is not acceptable to the host device 80 then the method 500 exits at step 560. If the file list 344 is acceptable then the data corresponding to the file list 344 from the media 50 is transferred to the host at step 550. At step 555, the method 500 determines if the transfer has ended. If the transfer has not ended then the transfer continues at step 550. If the transfer has ended, then method 500 proceeds to step 560 to update the host file data structure 342 to indicate which files have been transferred to the host and then proceeds to step 565 to exit.

Although various embodiments which incorporate the teachings of the invention have been shown and described in detail herein, those skilled in the art can readily devise many other varied embodiments within the scope of the invention. For example, the memory may include combinations of the buffer memory 32, the media 50, or an external read ahead memory. In another aspect, the interface 39 may be located internal or external to the disc drive or be in a separate circuit system adapted to interface with the 1394 bus and the host device 80.

In summary, aspects of the invention have particular advantages in electronic data storage systems. In one embodiment, the invention provides the steps of providing data and a data structure 434 from a peripheral device to a disc drive, interfacing 510 the disc drive with a host output device 80, transferring 550 the data from a disc drive to the host device 80, determining a data transfer structure 530, and storing the data transfer structure 560. In one aspect, the data structure comprises a file type and file size. In another aspect, transferring the data comprises using a USB interface protocol 39. In another aspect, the host device 80 comprises a computer and printer. In still another aspect, determining the data transfer structure includes determining which data has been transferred to the host device 80. In addition, the method 500 includes the steps of comparing 530 the data transfer structure to the data structure then transferring, to the host device 80, the difference 334 between the data transfer structure 342 and the data structure 334.

In another embodiment, the invention provides a method 500 of transferring data from a client disc drive to a host device 80, including the steps of connecting 515 a disc drive client device to a host device 80 across an interface 39, where if the host device 80 is not communicating 510 to the disc drive client then aborting 565 the transfer of data, where if the disc drive client is responsive to the host device 80, then determining 520 a disc drive client data structure, then determining 525 the file type and size stored on the disc drive client, determining 530 the files transferred from the disc drive client to the host device 80; and comparing 535 the disc drive client file structure and the files transferred to the host device 80; and transferring 550 the data difference 344. In one aspect, the interface comprises a USB interface 39. In another aspect, the host device 80 and disc drive client device comprise a 1394 interface. In still another aspect, the host device 80 comprises a printer or computer. In another aspect, the disc drive client data structure 334 is a file allocation table and where the step of determining 535 the files transferred from the disc drive client to the host device 80 comprises comparing 535 the disc drive client data structure 334 to a host data structure 342.

In still another embodiment, the invention provides a disc drive system including a signal-bearing media means 50 for storing data, a code memory means 35 coupled to a read/write controller means 33 for controlling the reading and writing of data to the signal-bearing media 50, means 40 for reading and writing the data to the signal-bearing media 50, means for interfacing 39 with a host device 80, a processor means coupled to the code memory 35 and the read/write controller 33 comprising a program 325 for transferring the data from the media 50 to the host device 80. The program when executed by the processor means 34 performs the steps of connecting 515 a disc drive client device to a host device 80 across an interface 39, where if the host device 39 is not communicating 510 to the client device then aborting 565 the transfer of data, where if the disc drive client is responsive to the host device 80, then determining a disc drive client device data structure 334, then determining 520 the file type and size stored on the disc drive client device, then determining 530 the files transferred from the disc drive client to the host device 80; and then comparing 535 the disc drive client device file structure and the files transferred to the host device 80 to determine a data difference 344; and transferring the data difference 344. In one aspect, the interface 39 comprises a USB interface. In another aspect, the host device 80 and disc drive client device comprise a 1394 interface 39. In another aspect, the host device 80 comprises a printer or computer. In still another aspect, the disc drive client data structure 334 is a file allocation table. In another aspect, determining 530 the files transferred from the disc drive client to the host device 80 includes comparing 535 the disc drive client data structure 334 to a host data structure 342.

While foregoing is directed to the various embodiments of the invention, other and further embodiments of the invention may be devised without departing from the basic scope thereof, and the scope thereof is determined by the claims that follow.

What is claimed is:

1. A method of transferring data from a storage device to a host, comprising:
   a) determining the location of each file from a file data structure stored on a storage device;
   b) retrieving a file data structure of the host;
   c) comparing the file data structure stored on the storage device to the file data structure of the host to determine a list of files not transferred to the host; and d) transferring at least a portion of the data corresponding to the list of files that have not been transferred to the host from the storage device to the host.

2. The method of claim 1, further comprising interfacing the data storage device to the host.

3. The method of claim 1, further comprising:
e) determining if the host is in communication with the storage device, and
if the host is in communication with the storage device, transferring the data that has not been transferred to the host; or
if the host is not in communication with the storage device, aborting the transfer.

4. The method of claim 3, further comprising repeating steps d) and e) until all of the data on the storage device that is to be transferred to the host has been transferred to the host.

5. The method of claim 3, further comprising repeating steps b) through e) until all of the data on the storage device that is to be transferred to the host has been transferred to the host.

6. The method of claim 1, further comprising determining a file structure to determine a file type and size based of the files stored on the storage device.

7. The method of claim 1, wherein determining the list of files that has not been transferred to the host includes producing or updating a client files not transferred data structure.

8. The method of claim 7, wherein the client files not transferred data structure includes a difference between what is to be transferred to the host and what has not been transferred to the host.

9. The method of claim 1, wherein an interface between the storage device and the host includes a USB interface.

10. The method of claim 1, wherein an interface between the storage device and the host includes an IEEE 1394 interface.

11. The method of claim 1, wherein an interface between the storage device and the host comprises a serial interface.

12. A storage device system, comprising:
a signal-bearing medium for storing data;
an interface for interfacing with a host;
a controller, the controller including a processor coupled to code memory that stores instructions for instructing the processor to:
determine the location of each file from a file data structure stored on a storage device;
retrieve a file data structure of the host;
compare the file data structure stored on the storage device to the file data structure of the host to determine a list of files not transferred to the host; and
transfer at least a portion of the data corresponding to the list of files that have not been transferred to the host from the storage device to the host.

13. The storage device system of claim 12, wherein the processor is further instructed to continue to transfer the data that is to be transferred to the host until all the data that is to be transferred to the host has been transferred or until the host is no longer communicating with the storage device.

14. The storage device system of claim 12, wherein the processor is further instructed to produce a host file structure comprised of data to be transferred to the host, and a files not transferred data structure comprised of data in the host file structure that has not been transferred.

15. The storage device system of claim 14, wherein the processor is further instructed to transfer the data in the files not transferred data structure to the host.

16. The storage device system of claim 12, wherein the interface comprises a USB interface.

17. The storage device system of claim 12, wherein the interface comprises an IEEE 1394 interface.

18. The storage device system of claim 12, wherein the interface comprises a serial interface.

19. The storage device system of claim 12, wherein the signal-bearing medium includes a magnetic disc.

20. The storage device system of claim 12, further including a system for impressing a signal on the signal-bearing medium, the system including a write controller.

* * * * *